US010349213B2

(12) United States Patent
Berger et al.

(10) Patent No.: US 10,349,213 B2
(45) Date of Patent: Jul. 9, 2019

(54) METHOD AND APPARATUS FOR DETERMINING AN ANGLE OF ARRIVAL OF A WIRELESS SIGNAL

(71) Applicant: Marvell World Trade Ltd., St. Michael (BB)

(72) Inventors: Christian R. Berger, San Jose, CA (US); Niranjan Grandhe, San Jose, CA (US); Sudhir Srinivasa, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/694,390

(22) Filed: Sep. 1, 2017

(65) Prior Publication Data
US 2018/0070205 A1 Mar. 8, 2018

Related U.S. Application Data

(60) Provisional application No. 62/383,114, filed on Sep. 2, 2016.

(51) Int. Cl.
*H04L 29/08* (2006.01)
*H04W 72/04* (2009.01)
(Continued)

(52) U.S. Cl.
CPC .............. *H04W 4/023* (2013.01); *G01S 3/46* (2013.01); *H04W 56/0065* (2013.01); *G01S 3/14* (2013.01);
(Continued)

(58) Field of Classification Search
CPC ... H04B 1/7093; H04B 1/7117; H04J 3/0682; H04J 3/0655; H04L 49/9094;
(Continued)

(56) References Cited

U.S. PATENT DOCUMENTS

2012/0288023 A1   11/2012   Karabinis
2016/0269234 A1*  9/2016   Zheng ................. H04L 65/605

FOREIGN PATENT DOCUMENTS

EP              2398290 A1 * 12/2011   ............... G01S 5/12

OTHER PUBLICATIONS

Anil, M. Rao, Efficient Detection With Arrays in the Presence of Angular Spreading, IEEE, Feb. 2003.*
(Continued)

*Primary Examiner* — Gary Lafontant

(57) ABSTRACT

At an antenna array of a first communication device, a wireless signal transmitted by a second communication device is received. The first communication device calculates a plurality of oversampled matched filter values corresponding to the wireless signal, which correspond to i) different values of a signal delay corresponding to the wireless signal, and ii) different values of a phase corresponding to the wireless signal. The first communication device determines a local maximum of the plurality of oversampled matched filter values across different values of the signal delay and different values of the phase, where the local maximum corresponds to a component of the wireless signal that is first to arrive at the antenna array. The first communication device calculates an angle of arrival of the wireless signal at the antenna array using a value of the phase corresponding to the local maximum of the plurality of matched filter values.

23 Claims, 6 Drawing Sheets

(51) Int. Cl.
*H04W 4/02* (2018.01)
*H04W 56/00* (2009.01)
*G01S 3/46* (2006.01)
*G01S 3/14* (2006.01)
*H04L 25/02* (2006.01)
*H04W 84/12* (2009.01)
*H04B 7/08* (2006.01)

(52) U.S. Cl.
CPC ............ *H04B 7/086* (2013.01); *H04L 25/022* (2013.01); *H04W 84/12* (2013.01)

(58) Field of Classification Search
CPC ............... H04W 72/085; H04W 4/023; H04W 56/0065; G01S 19/29; G01S 3/46; H03H 17/0254
See application file for complete search history.

(56) References Cited

OTHER PUBLICATIONS

Chong, Estimating Directions and Times of Arrival of Multipath Signals Using a Calibrated Space-Time Antenna Array, 1998, IEEE.*

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-425 (Dec. 18, 2013).

Ström, "Waveform and Receiver Filter Selection for Wideband Radar Applications," Chalmers Univ. of Tech., Sep. 2015 (80 pages).

Ender, "Introduction to Radar, Part I, Scriptum of a lecture at the Ruhr-Universität Bochum," Ruhr-University Bochum, Apr. 2011 (179 pages).

Geiger, "High Resolution Time Difference of Arrival Using Timestamps for Localization in 802.11b/g Wireless Networks," *2010 IEEE Wireless Communications and Networking Conference (WCNC)*, Apr. 18-21, 2010, 6 pages.

International Search Report and Written Opinion in International Patent Application No. PCT/US2017/049935, dated Dec. 8, 2017 (15 pages).

Rao et al., "Efficient Detection with Arrays in the Presence of Angular Spreading," *IEEE Trans. on Signal Processing*, vol. 51, No. 2, pp. 301-312 (Feb. 1, 2003).

See et al., "Estimating Directions and Times of Arrival of Multipath Signals Using a Calibrated Space-Time Antenna Array," *Proc. of Ninth IEEE SP Workshop on Statistical Signal and Array Processing*, Portland, Oregon, Sep. 14-16, 1998, pp. 364-367.

Wirth, "Direction of arrival estimation with multipath scattering by space-time processing," *Signal Processing*, Elsevier Science Publishers, vol. 84, No. 9, pp. 1677-1688 (Sep. 1, 2004).

* cited by examiner

METHOD AND APPARATUS FOR DETERMINING AN ANGLE OF ARRIVAL OF A WIRELESS SIGNAL

CROSS REFERENCES TO RELATED APPLICATIONS

This application claims the benefit of U.S. Provisional Patent App. No. 62/383,114, entitled "Wi-Fi Angle-of-Arrival Processing," filed on Sep. 2, 2016, the disclosure of which is hereby expressly incorporated herein by reference in its entirety.

FIELD OF TECHNOLOGY

The present disclosure relates generally to wireless communication systems, and more particularly to methods for determining an angle of incidence of a wireless signal at a communication device.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11 ac Standard specifies a single-user peak throughput in the gigabits per second (Gbps) range. Future standards promise to provide even greater throughput, such as throughputs in the tens of Gbps range.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

SUMMARY

In an embodiment, a method includes: receiving, at an antenna array of a first communication device, a wireless signal transmitted by a second communication device, wherein the antenna array comprises a plurality of antennas; calculating, at the first communication device, a plurality of oversampled matched filter values corresponding to the wireless signal, the plurality of matched filter values corresponding to i) different values of a signal delay corresponding to the wireless signal, and ii) different values of a phase corresponding to the wireless signal; determining, at the first communication device, a local maximum of the plurality of oversampled matched filter values across different values of the signal delay and different values of the phase, the local maximum of the plurality of matched filter values corresponding to a component of the wireless signal that is first to arrive at the antenna array; and calculating, at the communication device, an angle of arrival using a value of the phase corresponding to the local maximum of the plurality of matched filter values, wherein the angle of arrival corresponds to an angle of incidence at the antenna array of the wireless signal.

In another embodiment, an apparatus comprises: one or more integrated circuits (ICs); and a network interface device associated with a first communication device, wherein the network interface device is implemented on the one or more ICs, the network interface device including a plurality of transceivers. The one or more ICs are configured to: calculate a plurality of oversampled matched filter values corresponding to a wireless signal received at an antenna array of the first communication device, the plurality of matched filter values corresponding to i) different values of a signal delay corresponding to the wireless signal, and ii) different values of a phase corresponding to the wireless signal, wherein the wireless signal was transmitted by a second communication device, wherein the antenna array comprises a plurality of antenna elements, and wherein the plurality of transceivers is coupled to the antenna array; determine a local maximum of the plurality of oversampled matched filter values across different values of the signal delay and different values of the phase, the local maximum of the plurality of matched filter values corresponding to a component of the wireless signal that is first to arrive at the antenna array; and calculate an angle of arrival using a value of the phase corresponding to the local maximum of the plurality of matched filter values, wherein the angle of arrival corresponds to an angle of incidence at the antenna array of the wireless signal.

DETAILED DESCRIPTION

Embodiments of techniques for determining an angle of arrival of a wireless signal at an antenna array of a first communication device, where the wireless signal has been transmitted by a second communication device, are described below. Such an angle of arrival is useful for determining a position of the second communication device, such as when the first communication device and the second communication device are located within a building and satellite-based positioning is not available or is inaccurate, the second communication device does not include satellite positioning capability, etc., according to some embodiments. For example, a distance between the first communication device and the second communication device can be determined by measuring a time of flight of wireless transmissions between the first communication device and the second communication device, and the determined distance and the determined angle of arrival may be used to determine a position of the second communication device.

In other embodiments, a determined angle of arrival may be used to calculate, select, or adjust a beamsteering vector or matrix. Use of such a beamsteering vector or matrix may improve throughput and/or range, in some embodiments. In other embodiments, a determined angle of arrival may be used determine a direction of interference. The determined direction of interference may be used to mitigate or avoid the interference by, for example, calculating, selecting, or adjusting a beamsteering vector or matrix that exhibits low gain in the determined direction of the interference.

Embodiments of techniques for determining an angle of arrival of a wireless signal are discussed below in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, determination of angle of arrival techniques are utilized in other types of wireless communication systems such as personal area networks (PANs), mobile communication networks such as cellular networks, metropolitan area networks (MANs), satellite communication networks, etc.

Figure 1:
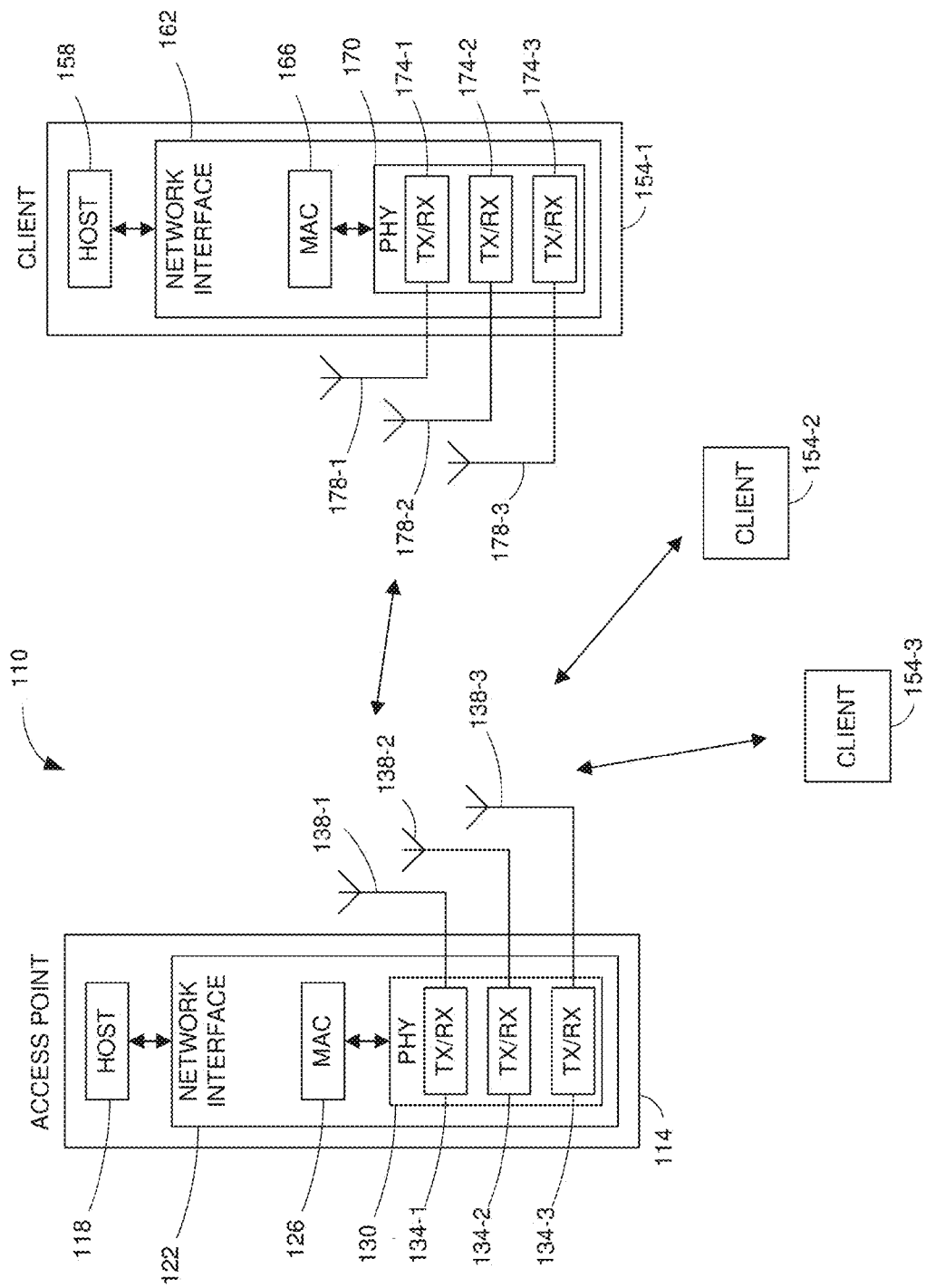
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The host processor 118 is coupled to a memory device (not shown) that stores machine readable instructions that, when executed by the host processor 118, cause the host processor to perform various acts.

The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The host processor 158 is coupled to a memory device (not shown) that stores machine readable instructions that, when executed by the host processor 158, cause the host processor to perform various acts.

The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
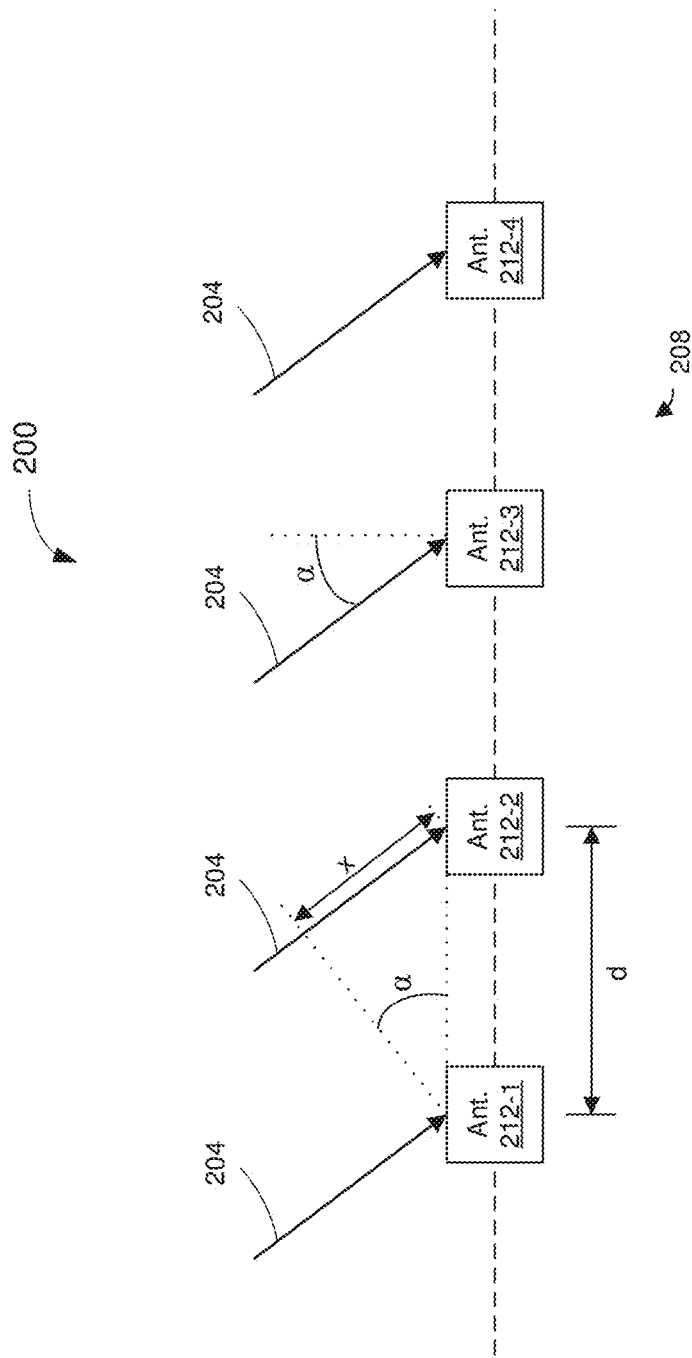
FIG. 2 is a diagram of a model of a wireless signal arriving at a linear antenna array, according to an embodiment.

FIG. 2 is a diagram of a model 200 of a wireless signal 204 arriving at a linear antenna array 208, according to an embodiment. The linear antenna array 208 includes four antenna elements 212, although four antenna elements is not required. In other embodiments, for example, an antenna array comprises another suitable number of antenna elements, such as two, three, five, six, seven, etc.

The wireless signal 204 is modeled as:

$$y_k(t) = \Sigma_{p=1}^P A_p e^{j\varphi_{p,k}} s(t-\tau_p) + n_k(t) \quad \text{(Equation 1)}$$

where $y_k(t)$ is the wireless signal 204 as received at the k-th antenna 212, p is an index indicating a p-th component of the wireless signal 204, P is the number of components of the wireless signal 204, s(t) is the wireless signal 204 as originally transmitted, $A_p$ is an amplitude of the p-th component of the wireless signal 204, $\varphi_{p,k}$ is a phase of the p-th component of the wireless signal 204 at the k-th antenna 212-k, $\tau_p$ is a delay of the p-th component of the wireless signal 204, and $n_k(t)$ is noise received at the k-th antenna. The different components of the wireless signal 204 include a direct component and one or more multipath components. In the model 200, it is assumed that $A_p$ and $\tau_p$ are the same for all of the antennas, i.e., for all k.

In the model 200, the antenna elements 212 are spaced apart by a distance d. A component of the wireless signal 204 arrives at the linear antenna array 208 with an incidental angle α. Because of the angle of incidence, the component of the wireless signal 204 will arrive at the antenna element 212-1 first. Also because of the angle of incidence, the component of the wireless signal 204 must travel additional distances to reach the antenna elements 212-2 through 212-4, and thus the component of the wireless signal 204 will reach the antenna elements 212-2 through 212-4 at successively later times as compared to a time at which wireless signal 204 arrives at the antenna element 212-1. A distance x corresponds to an additional travel distance of the component of the wireless signal 204 to a $(k+1)^{th}$ antenna element 212 as compared to a $k^{th}$ antenna element 212. The additional travel distance x can be modeled as:

$$x = d \sin(\alpha) \quad \text{(Equation 2)}$$

A time difference $\Delta t$ corresponds to an additional travel time of the component of the wireless signal 204 to the $(k+1)^{th}$ antenna element 212 as compared to the $k^{th}$ antenna element 212, and can be modeled as:

$$\Delta t = \frac{x}{c} \quad \text{(Equation 3)}$$

where c is the speed of light.

A phase difference $\Delta \varphi$ corresponds to an additional travel time of the component of the wireless signal 204 to the $(k+1)^{th}$ antenna element 212 as compared to the $k^{th}$ antenna element 212, and can be modeled as:

$$\Delta \varphi = 2\pi \frac{\Delta t}{T} = 2\pi \frac{d \sin(\alpha)}{Tc} \quad \text{(Equation 4)}$$

where T is a period of the wireless signal 204, c is the speed of light, and Tc is the wavelength λ of the wireless signal 204. For a WLAN signal, λ may be considered the center frequency of WLAN signal. For example, the IEEE 802.11 Standard defines a Channel 11 having a center frequency at 2462 MHz, and defines a Channel 36 having a center frequency at 5180 MHz. Thus, the wavelength λ of the wireless signal 204 transmitted in Channel 11 may be considered to 12.2 cm, and the wavelength λ of the wireless signal 204 transmitted in Channel 36 may be considered to 5.8 cm. Equation 4 may be rewritten as:

$$\Delta \varphi = 2\pi \frac{d}{\lambda} \sin(\alpha) \quad \text{(Equation 5)}$$

Typically, the antenna spacing d is less than λ/2. If the antenna spacing d is greater than λ/2, the absolute value of Δφ may be greater than π, which is ambiguous.

The phase $\varphi_{p,k}$ of the p-th component of the wireless signal 204 at the k-th antenna 212 can be modeled as:

$$\varphi_{p,k} = \varphi_{p,0}, \text{ for } k=0$$

$$\varphi_{p,k} = \varphi_{p,0} + k\Delta\varphi, \text{ for } k=1,\ldots K-1 \quad \text{(Equation 6)}$$

where K is the number of antennas 212 in the antenna array 208.

Some radar systems use a matched filter technique to determine an angle of incidence of a radar signal reflection, as will be described in more detail below. A matched filter Φ for the model 200 can be expressed as:

$$\Phi(\varphi,t) = \Sigma_{k=0}^{K-1} e^{-jk\varphi} \int y_k(t) s^*(t-\tau) \partial t \quad \text{(Equation 7)}$$

If the noise in $y_k(t)$ is neglected, Equation 7 can be rewritten as:

$$\Phi(\varphi,\tau) = \Sigma_{p=1}^P \Sigma_{k=0}^{K-1} e^{-jk\varphi} A_p e^{j\varphi_{p,k}} \int s(t-\tau_p) s^*(t-\tau) \partial t \quad \text{(Equation 8)}$$

A time autocorrelation function of s(t) can be defined as:

$$\Phi_{SS}(\tau-\tau_p) = \int s(t-\tau_p) s^*(t-\tau) \partial t, \quad \text{(Equation 9)}$$

and an antenna array correlation function for the linear antenna array of the model 200 can be defined as:

$$\Phi_{ULA}(\varphi-\varphi_{p,k}) = \Sigma_{k=0}^{K-1} e^{-jk(\varphi-\varphi_{p,k})} \quad \text{(Equation 10)}$$

Thus, Equation 8 can be rewritten as:

$$\Phi(\varphi,\tau) = \Sigma_{p=1}^P A_p \Phi_{ULA}(\varphi-\varphi_{p,k}) \Phi_{SS}(\tau-\tau_p) \quad \text{(Equation 11)}$$

Some radar systems use a matched filter similar to Equation 11 to determine an angle of incidence of a reflection of a radar signal. In such radar systems, the signal s(t) is designed such that:

$$\Phi_{SS}(\tau-\tau_p) \approx 0 \ \forall |\tau-\tau_p| > 1/B, \quad \text{(Equation 12)}$$

where B is a bandwidth of the signal s(t). Additionally, the antenna array correlation function for the linear antenna array of the model 200 can be simplified to:

$$\Phi_{ULA}(\varphi-\varphi_{p,k}) \approx \sin(K(\varphi-\varphi_{p,k}))/\sin(\varphi-\varphi_{p,k}) \quad \text{(Equation 13)}$$

which is small for $(\varphi-\varphi_{p,k}) > \pi/K$. In other words, the matched filter $\Phi(\varphi,\tau)$ is close to zero except for each particular $(\varphi,\tau)$ tuple that matches a component of the received signal corresponding to the same ($\varphi,\tau$) tuple. In this way, a radar system can analyze the matched filter $\Phi(\varphi,\tau)$ to identify a non-zero value, and then determine the phase $\varphi$ corresponding to the non-zero value. For example, a radar system may analyze a grid of matched filter $\Phi(\varphi,\tau)$ values corresponding to different ($\varphi,\tau$) tuples to identify non-zero values. The radar system then uses the phase $\varphi$ corresponding to each non-zero value to calculate the respective incidental angle $\alpha$ of a respective reflection of the radar signal off of a respective radar target.

In radar systems, radar targets are typically spread apart over large distances and the antenna components of the antenna array spaced across a relatively large distance. Additionally, the ($\varphi,\tau$) tuple spacing of the grid of matched filter $\Phi(\varphi,\tau)$ values is generally designed to be dense enough to not miss targets, but wide enough such that a target corresponds usually to only one non-zero ($\varphi,\tau$) tuple, and at most two non-zero ($\varphi,\tau$) tuples. Thus, different components of the received radar signal corresponding to different radar targets tend to have non-zero ($\varphi,\tau$) tuples that are widely spaced within the grid and easy to distinguish from one another. If there are two adjacent non-zero ($\varphi,\tau$) tuples in the grid of matched filter $\Phi(\varphi,\tau)$ values, the radar system typically assumes that the two adjacent non-zero ($\varphi,\tau$) tuples correspond to a single radar target.

A typical WLAN environment is significantly different than the radar system environment discussed above. For example, the number of antenna elements of a WLAN device is much smaller and the components are spaced apart across a much smaller distance as compared to the antenna components of radar systems. As another example, the differences between phases ($\varphi$) and delays ($\tau$) corresponding different components of a WLAN signal (e.g., a direct component and multipath components) are much smaller as compared to radar systems. Moreover, the direct component of a WLAN signal typically is the only component of interest for calculating an angle of incidence—the multipath components typically are not of interest and act merely as clutter or noise with regard to calculating an angle of incidence of a WLAN signal.

In embodiments described below, a matched filter for determining an angle of incidence in a WLAN is calculated using oversampling to increase a resolution of the matched filter as compared to radar matched filters discussed above. The increased resolution of the matched filter facilitates the identification of, and distinguishing between, local maxima in the matched filter corresponding to the different components of a WLAN signal, e.g., a direct component and multipath components.

A matched filter $\Phi_{WLAN}$ for a WLAN can be expressed as:

$$\Phi_{WLAN}(\varphi,\tau) = \Phi_{ANT}(\varphi) \int y_k(t) s^*(t-\tau) \partial t \quad \text{(Equation 14)}$$

where $\Phi_{ANT}(\varphi)$ is an antenna array-specific function that depends on the type of antenna array of the receiving device. For example, for a uniform linear antenna array such as discussed above, $\Phi_{ANT}(\varphi) = \Sigma_{k=0}^{K-1} e^{-jk\varphi}$. In example embodiments discussed below, a uniform linear antenna array is utilized. In other embodiments that use a different type of antenna array, a different antenna array-specific function $\Phi_{ANT}(\varphi)$ is used.

The second component of Equation 14 corresponds to an impulse response, $h_k(\tau)$, of a channel H:

$$h_k(\tau) = \int y_k(t) s^*(t-\tau) \partial t \quad \text{(Equation 15)}$$

In WLAN systems that utilize orthogonal frequency division multiplexing (OFDM), devices typically estimate a frequency domain representation $H_k(n)$ of the channel H for each OFDM subcarrier ($f_n$) for purposes of equalization, beamforming, spatial multiplexing, etc.:

$$H_k[n] = Y_k(f_n) X_k^*(f_n), \quad f_n = \frac{B}{N} n \quad \text{(Equation 16)}$$

where $Y_k(f_n)$ is a frequency domain component of the received OFDM signal $y_k(t)$ at the subcarrier frequency $f_n$, $X_k(f_n)$ is a frequency domain component of the transmitted OFDM signal $x_k(t)$ at $f_n$, N is a number of OFDM subcarriers, B is a bandwidth of the OFDM signal, $$\frac{B}{N}$$

is an OFDM subcarrier spacing in Hertz, and n is an OFDM subcarrier index. The impulse response $h_k(\tau)$ can be calculated from $H_k[n]$ using an inverse discrete Fourier transform (e.g., an inverse fast Fourier transform (IFFT) of size N):

$$h_k(\tau) = \sum_{n=0}^{N-1} H_k[n] e^{j2\pi \frac{n}{N} B\tau} \quad \text{(Equation 17)}$$

Thus, Equation 14 can be rewritten as:

$$\Phi_{WLAN}(\varphi,\tau) = \Phi_{ANT}(\varphi) h_k(\tau) \quad \text{(Equation 18)}$$

or $$\Phi_{WLAN}(\varphi,\tau) = \Phi_{ANT}(\varphi) \sum_{n=0}^{N-1} H_k[n] e^{j2\pi \frac{n}{N} B\tau} \quad \text{(Equation 19)}$$

In some embodiments, to increase resolution of the matched filter $\Phi_{WLAN}$ by a factor of r, the frequency domain representation $H_k[n]$ is padded with rN zeros, and a size rN IFFT is performed:

$$h_k^{upsample}(\tau) = \sum_{n=0}^{rN-1} H_k^{padded}[n] e^{j2\pi \frac{n}{N} B\tau} \quad \text{(Equation 20)}$$

The technique for increasing resolution reflected in Equation 17 is sometimes referred to as upsampling or oversampling. Additionally, a higher resolution of the antenna array-specific function $\Phi_{ANT}(\varphi)$ is calculated using any suitable technique (e.g., interpolation, employing a spline function, upsampling, etc.). Then, the matched filter $\Phi_{WLAN}$ is calculated with the higher resolution antenna array-specific function $\Phi_{ANT}(\varphi)$ and $h_k^{interp}(\tau)$, resulting in a matched filter with increased resolution.

In other embodiments, to increase resolution of the matched filter $\Phi_{WLAN}$ by a factor of r, r zeros are inserted between successive elements of the impulse response $h_k(\tau)$ generate $h_k^{padded}(\tau)$, and then $h_k^{padded}(\tau)$ is low pass filtered to generate a higher resolution impulse response $h_k^{upsample}(\tau)$ (which is another implementation of upsampling or oversampling). Then, the matched filter $\Phi_{WLAN}$ is calculated with the higher resolution antenna array-specific function $\Phi_{ANT}(\varphi)$ and $h_k^{interp}(\tau)$, resulting in a matched filter with increased resolution.

In still other embodiments, the matched filter $\Phi_{WLAN}$ is calculated according to Equations 14 or 18, for example, and then a higher resolution of the matched filter $\Phi_{WLAN}$ is calculated using any suitable technique (e.g., interpolation, employing a spline function, upsampling, etc.).

For a linear array such as illustrated in FIG. 2, Equation 19 can be rewritten as:

$$\Phi_{WLAN}(\varphi_m, \tau_t) = \sum_{k=0}^{\beta_\varphi K-1} \sum_{n=0}^{\beta_\tau N-1} H_k^{padded}(n) e^{j2\pi[ni/\beta_\tau N - km/\beta_\varphi K]} \quad \text{(Equation 21)}$$

where $$\varphi_m = \frac{2\pi}{\beta_\varphi B} m,$$

m is an index corresponding to different values of $\varphi$, $\beta_\varphi$ is a step size parameter corresponding to $\varphi$, $\beta_\varphi$ is a positive integer greater than one, $$\frac{2\pi}{\beta_\varphi B}$$

is a step size corresponding to $\varphi$, $$\tau_t = \frac{1}{\beta_\tau B} t,$$

t is an index corresponding to different values of $\tau$, $\beta_\tau$ is a step size parameter corresponding to $\tau$, $\beta_\tau$ is a positive integer greater than one, $$\frac{1}{\beta_\tau B}$$

is a step size corresponding to $\tau$. Equation 21 corresponds to a 2-dimensional (2D) FFT of size $(\beta_\tau N \times \beta_\varphi K)$. Equation 21 corresponds to an upsampled matched filter $\Phi_{WLAN}$ because the channel estimate H is padded with zeros and the 2D FFT is calculated over $(\beta_\tau N \times \beta_\varphi K)$, where $\beta_\tau N > N$ and $\beta_\varphi K > K$.

Figure 3:
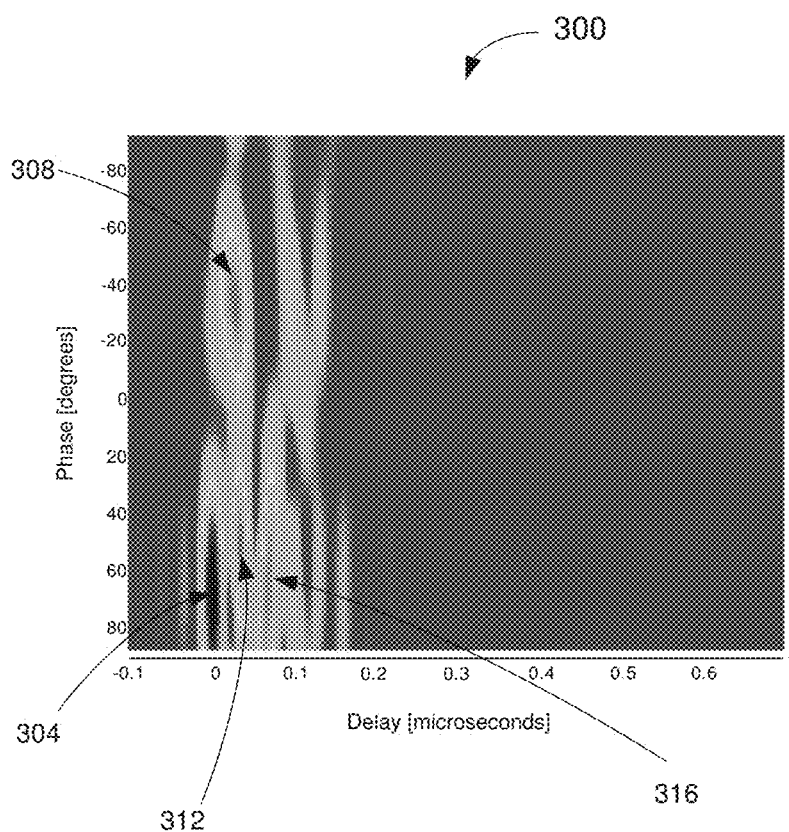
FIG. 3 is a plot of an example matched filter output generated in response to receiving a WLAN signal such as a WLAN packet, according to an embodiment.

FIG. 3 is a plot of 200 of an example matched filter output generated in response to receiving a WLAN signal such as a WLAN packet, according to an embodiment. For example, the plot 200 is generated according to Equation 21, in an embodiment. The horizontal axis of the plot 200 corresponds to different delay ($\tau$) values, and the vertical axis of the plot 200 corresponds to different phase ($\varphi$) values. The plot 200 includes a plurality of local maxima, including local maxima 304, 308, 312, and 316, which correspond to different components of the WLAN packet transmission (e.g., a direct component (e.g., line-of-sight component, and multipath components). In a typical WLAN scenario, the most direct component (e.g., line-of-sight component) will have the shortest delay ($\tau$). Thus, in an embodiment, the local maximum corresponding to the most direct component (e.g., line-of-sight component) is determined by determining the local maximum corresponding to the shortest delay ($\tau$). Then, the incidental angle $\alpha$ of the WLAN signal is calculated using the phase ($\varphi$) corresponding to the local maximum corresponding to the shortest delay ($\tau$).

In an embodiment, for a local maxima to be considered, the local maxima must also exceed a suitable threshold. In an embodiment, the threshold is a variable threshold that varies depending on a signal power corresponding to the received signal. Any suitable technique for calculating a signal power corresponding to the received signal may be used. Thus, when determining the local maximum corresponding to the shortest delay ($\tau$), only local maxima that exceed the threshold are considered, in an embodiment.

In an embodiment, to reduce the search space for local maxima, a delay value $\tau_{max}$ corresponding to a strongest component of the WLAN signal is determined, and then only local maxima corresponding to delays less than $\tau_{max}$ are considered. For example, $\tau_{max}$ is determined according to:

$$\tau_{max} = \max_\tau \sum_{k=0}^{K-1} |h_k(\tau)|^2 \quad \text{(Equation 22)}$$

Equation 22 corresponds to a 1-dimensional search as opposed to a 2-dimensional search for local maxima in an output generated according to Equation 21, and thus reducing the search space for local maxima using Equation 22 reduces the amount of processing overall. Accordingly, when determining the local maximum corresponding to the shortest delay ($\tau$), only local maxima that i) exceed the threshold and ii) correspond to a delay less than $\tau_{max}$ are considered, in an embodiment.

Figure 4:
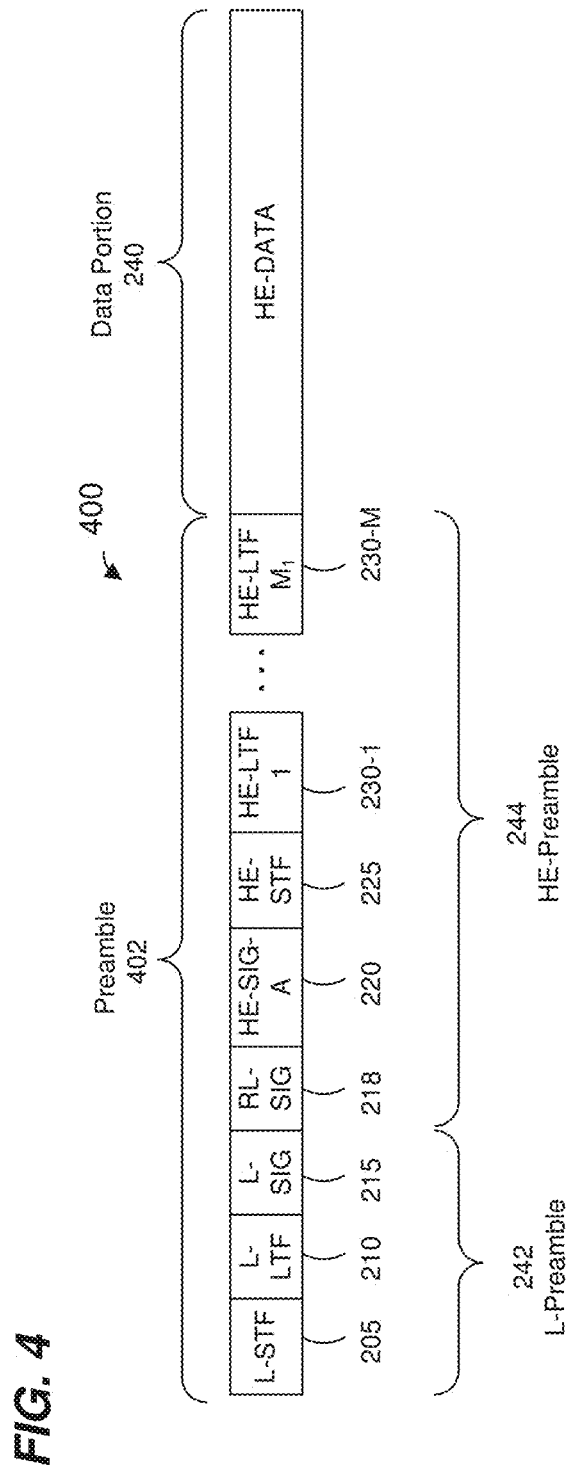
FIG. 4 is a diagram of a physical layer (PHY) data unit that communication devices in WLAN of FIG. 1 are configured to generate and transmit, according to an embodiment.

In some embodiments, the signal used for calculating a matched filter output is included in a PHY preamble of a PHY data unit. FIG. 4 is a diagram of a single-user PHY data unit 400 that the network interface 162 (FIG. 1) is configured to generate and transmit to the AP 114, according to an embodiment. The network interface 122 (FIG. 1) may also be configured to transmit data units the same as or similar to the data unit 400 to the one of the client stations 154 (e.g., the client station 154-1). The data unit 400 may occupy a 20 MHz bandwidth or another suitable bandwidth. Data units similar to the data unit 400 occupy other suitable bandwidth such as 40 MHz, 80 MHz, 160 MHz, 320 MHz, 640 MHz, for example, or other suitable bandwidths, in other embodiments.

The data unit 400 includes a preamble 402 including a legacy short training field (L-STF) 405, a legacy long training field (L-LTF) 410, a legacy signal field (L-SIG) 415, a repeated L-SIG field (RL-SIG) 418, a high efficiency (HE) signal field (HE-SIG-A) 420, an HE short training field (HE-STF) 425, and M HE long training fields (HE-LTFs) 430, where M is a suitable positive integer. In an embodiment, M generally corresponds to (e.g., is greater than or equal to) a number of spatial streams via which the data unit 400 will be transmitted. A legacy preamble portion 442 of the preamble 402 includes the L-STF 405, L-LTF 410 and L-SIG 415. An HE preamble portion 444 of the preamble 402 includes the RL-SIG 418, the HE-SIG-A 420, the HE-STF 425 and the M HE-LTFs 430. The data unit 400 also includes a data portion 440. In some scenarios, the data unit 400 may omit the data portion 440.

In some embodiments, the preamble 402 omits one or more of the fields 405-430. In some embodiments, the preamble 402 includes additional fields not illustrated in FIG. 4.

Each of the L-STF 405, the L-LTF 410, the L-SIG 415, the RL-SIG 418, the HE-SIG-A 420, the HE-SIG-B 422, the HE-STF 425, and the M HE-LTFs 430 comprises one or more OFDM symbols. As merely an illustrative example, the HE-SIG-A 420 comprises two OFDM symbols, at least in some embodiments.

In the illustration of FIG. 4, the data unit 400 includes one of each of the L-STF 405, the L-LTF 410, the L-SIG 415, the RL-SIG 418 and the HE-SIG-A 420. In some embodiments in which a data unit similar to the data unit 400 occupies a cumulative bandwidth other than 20 MHz, each of the L-STF 405, the L-LTF 410, the L-SIG 415, the RL-SIG 418, and the HE-SIG-A 420 is repeated over a corresponding number of 20 MHz sub-bands of the whole bandwidth of the data unit, in an embodiment. For example, in an embodiment in which the data unit occupies an 80 MHz bandwidth, the data unit 400 includes four of each of the L-STF 405, the L-LTF 410, the L-SIG 415, the RL-SIG 418, and the HE-SIG-A 420.

In an embodiment, one or more of the training signal fields L-STF 405, L-LTF 410, L-SIG 415, RL-SIG 418, HE-STF 425, and/or HE-LTFs 430, are used for calculating matched filter outputs is included in a PHY preamble of a PHY data unit. For example, L-LTF 410 and HE-LTFs 430 are typically used to generate channel estimates, and as discussed above, a channel estimate may be used to calculate matched filter outputs.

In other embodiments, a specialized packet for angle-of-arrival determination is used. For example, a PHY data unit of a format similar to the PHY data unit 400 is used, but training signals are appended to the preamble 402, e.g., instead of the data portion 240, according to an embodiment.

Figure 5:
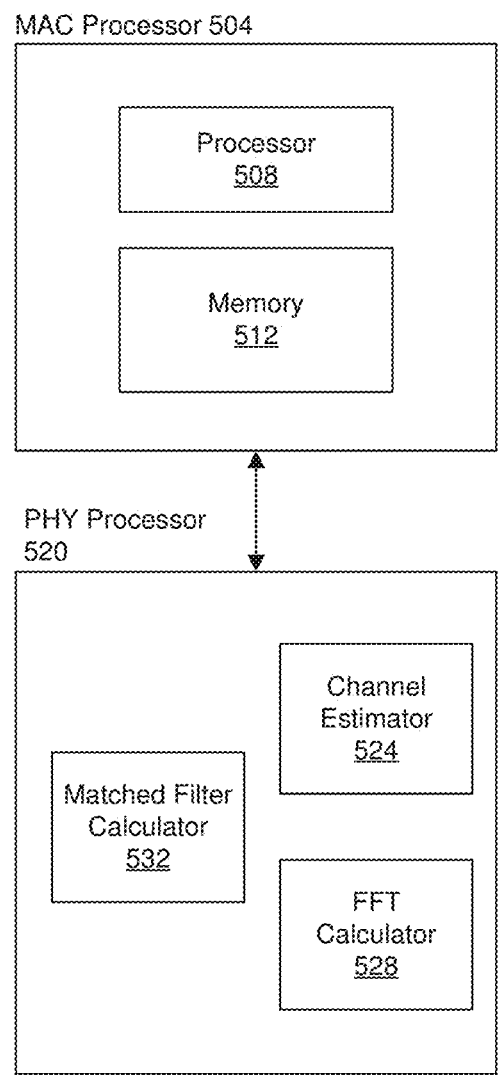
FIG. 5 is a block diagram of components of an example network interface device that performs calculations related to determining an angle of arrival of a wireless signal, according to an embodiment

FIG. 5 is a block diagram of components of an example network interface device related to angle-of-arrival calculations, according to an embodiment. The components of FIG. 5 are incorporated in the network interface 122 (FIG. 1) and/or the network interface 162, in some embodiments. A MAC processor 504, e.g., similar to the MAC processor 126 and/or the MAC processor 166 of FIG. 1, includes a processor 508 coupled to a memory 512, where the processor is configured to execute machine readable instructions stored in the memory 512. The memory 512 stores machine readable instructions for performing MAC layer functions, where such instructions are executed by the processor 508. As will be described in more detail below, the memory 512 also stores machine readable instructions for performing at least some calculations and/or processing related to angle-of-arrival determinations, where such instructions are executed by the processor 508, according to an embodiment.

A PHY processor 520, e.g., similar to the PHY processor 130 and/or the PHY processor 170 of FIG. 1, includes a channel estimator 524 configured to determine a channel estimate H based on a received signal, according to an embodiment. For example, the channel estimator 524 is configured to determine the channel estimate H one or more of the training signal fields L-STF 405, L-LTF 410, L-SIG 415, RL-SIG 418, HE-STF 425, and/or HE-LTFs 430. The channel estimate H determined by the channel estimator 524 may be used to calculate an angle-of-arrival of a PHY data unit, as discussed above.

The PHY processor 520 also includes an FFT calculator 528 configured to calculate FFTs, according to an embodiment. The FFT calculator 528 may also be configured to calculate inverse FFTs, according to an embodiment. The FFT calculator 528 is used by the PHY processor 520 to perform OFDM modulation, OFDM demodulation, etc., in some embodiments. The FFT calculator 528 may be used for performing angle-of-arrival FFT and/or inverse FFT calculations such as FFT and/or inverse FFT calculations associated with one or more of Equations 17 and 19-21, according to some embodiments.

The PHY processor 520 also includes a matched filter calculator 532 configured to calculate FFTs, according to an embodiment. The matched filter calculator 532 may be used for performing calculations associated with one or more of Equations 14 and 17-22, according to some embodiments. The matched filter calculator 532 may perform calculations using values generated by the channel estimator 524 and/or the FFT calculator 528, in some embodiments.

Referring again to the processor 508 and the memory 512, the memory 512 stores machine readable instructions, for example, for comparing values to thresholds, finding local maxima of the matched filter, determining whether local maxima of the matched filter satisfy one or more conditions, selecting a local maxima of the matched filter, calculating an angle-of-arrival based on a selected local maxima, etc., according to various embodiments.

Although the processor 508 and the memory 512 are illustrated as being components of the MAC processor 504, in other embodiments the processor 508 and the memory 512 are separate from the MAC processor 504.

The channel estimator 524, the FFT calculator 528 and/or the matched filter calculator 532 are implemented as hardware circuitry, according to some embodiments. Control operations associated with the channel estimator 524, the FFT calculator 528 and/or the matched filter calculator 532 may be performed by a controller (e.g., one or both of a hardware state machine or a processor that executes machine readable instructions).

Figure 6:
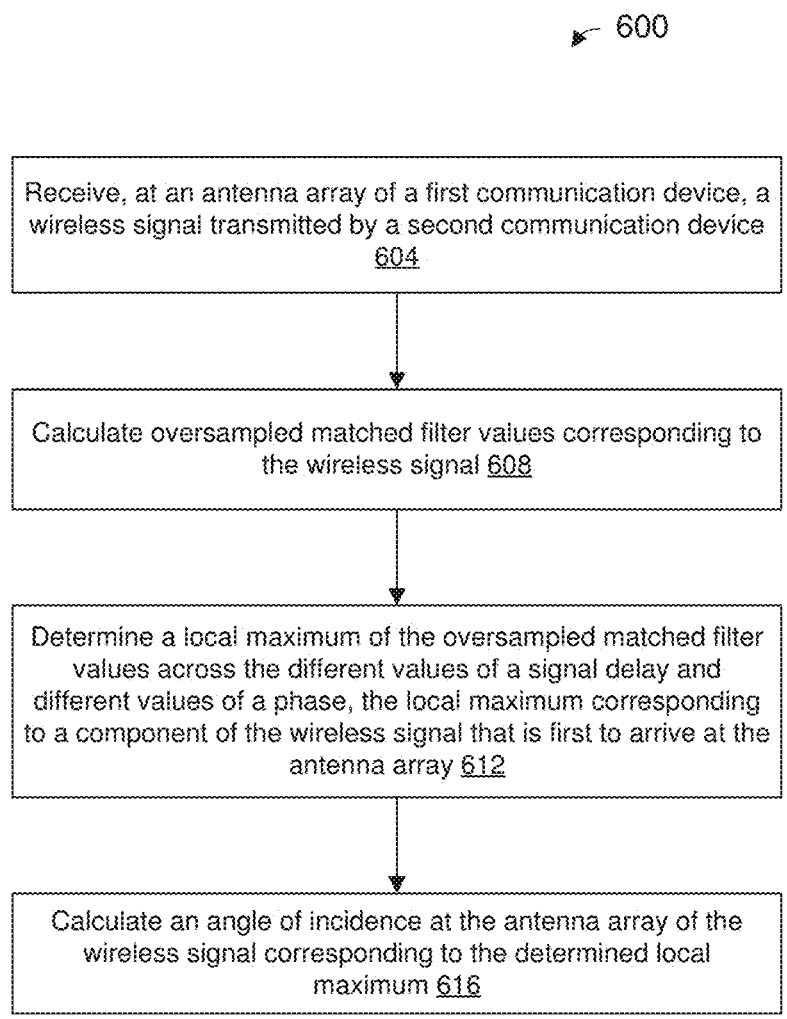
FIG. 6 is a flow diagram of an example method for calculating an angle of arrival of a wireless signal, according to an embodiment.

FIG. 6 is a flow diagram of an example method 600 for calculating an angle of arrival of a wireless signal, according to an embodiment. The method 600 is implemented by a communication device such as the AP 114 (FIG. 1), the client station 154 (FIG. 1), or another suitable communication device.

At block 604, a wireless signal is received at an antenna array of a first communication device, the wireless signal having been transmitted by a second communication device. The antenna array comprises a plurality of antenna elements. In an embodiment, the antenna array is a uniform linear array having a format similar to the model 200 discussed above with reference to FIG. 2. In other embodiments, the antenna array is not a linear array, but rather the antenna array has another suitable configuration.

The first communication device and the second communication device are within a WLAN, and the wireless signal is a WLAN signal, in an embodiment. The wireless signal corresponds to a PHY data unit having a format such as the PHY data unit 400 of FIG. 4, or another suitable format.

At block 608, a plurality of oversampled matched filter values are calculated, the plurality of oversampled matched filter values corresponding to i) different values of a time delay corresponding to the wireless signal, and ii) different values of a phase corresponding to the wireless signal.

In an embodiment, block 608 includes calculating the plurality of oversampled matched filter values according to Equation 14. In some embodiments, block 608 includes calculating the plurality of oversampled matched filter values using an estimate of a communication channel between the first communication device and the second communication device. For example, block 608 includes calculating the plurality of oversampled matched filter values according to one or both of Equations 19 and 21. In an embodiment, the channel estimator 524 (FIG. 5) calculates the channel estimate used to calculate the plurality of oversampled matched filter values. The wireless signal is a PHY data unit having a PHY preamble, and the channel estimate is calculated using one or more fields in the PHY preamble, according to an embodiment.

In some embodiments that use an estimate of the communication channel, block 608 includes calculating an inverse FFT on the channel estimate to generate an impulse response corresponding to the communication channel between the first communication device and the second communication device. In some embodiments that use an estimate of the communication channel, block 608 includes calculating a 2D FFT such as according to Equation 21. In some embodiments, the FFT calculator 528 (FIG. 5) calculates FFTs, inverse FFTs, etc.

In some embodiments, the matched filter calculator 532 (FIG. 5) calculates the plurality of oversampled matched filter values in block 608.

At block 612, a local maximum of the oversampled matched filter values corresponding to a component of the wireless signal that is first to arrive at the antenna array is determined. The local maximum is determined across different values of a signal delay corresponding to the wireless signal and different values of a phase corresponding to the wireless signal. In an embodiment, determining the local maximum includes determining whether the local maximum meets a threshold. In an embodiment, block 612 comprises limiting a search space of the plurality of oversampled matched filter values, including determining a maximum delay value and analyzing only local maxima corresponding to delays less than the maximum delay value.

At block 616, an angle of incidence (i.e., angle of arrival) at the antenna array of the wireless signal corresponding to the local maximum (determined at block 612) is determined.

In some embodiments, blocks 612 and 616 are implemented using a processor (e.g., the processor 508 (FIG. 5), the host processor 118, etc.) executing machine readable instructions. In other embodiments, blocks 612 and/or 616 are implemented using hardware circuitry.

In some embodiments, the matched filter values generated at block 608 are not oversampled.

In some embodiments, the method 600 further includes determining a position of the second communication device using the angle of incidence determined at block 616. For example, a distance between the first communication device and the second communication device can be determined by measuring a time of flight of wireless transmissions between the first communication device and the second communication device, and the determined distance and the determined angle of incidence are used to determine a position of the second communication device.

In other embodiments, the method 600 further includes determining, selecting, or adjusting a beamsteering vector or matrix using the angle of incidence determined at block 616. In other embodiments, the method 600 further includes determining a direction of interference using the angle of incidence determined at block 616.

As discussed above, blocks 608, 612, 616 may be implemented using hardware circuitry, one or more processors executing machine readable instructions (e.g., software, firmware, etc.), or a combination of hardware circuitry and processor(s) executing machine readable instructions. When executed using machine readable instructions, the one or more processors executing the machine readable instructions may include a processor separate from the network interface (e.g., the host processor 118) and/or one or more processors included in the network interface (e.g., the processor 508).

In an embodiment, a method includes: receiving, at an antenna array of a first communication device, a wireless signal transmitted by a second communication device, wherein the antenna array comprises a plurality of antennas; calculating, at the first communication device, a plurality of oversampled matched filter values corresponding to the wireless signal, the plurality of matched filter values corresponding to i) different values of a signal delay corresponding to the wireless signal, and ii) different values of a phase corresponding to the wireless signal; determining, at the first communication device, a local maximum of the plurality of oversampled matched filter values across different values of the signal delay and different values of the phase, the local maximum of the plurality of matched filter values corresponding to a component of the wireless signal that is first to arrive at the antenna array; and calculating, at the communication device, an angle of arrival using a value of the phase corresponding to the local maximum of the plurality of matched filter values, wherein the angle of arrival corresponds to an angle of incidence at the antenna array of the wireless signal.

In other embodiments, the method includes one of, or any suitable combination of two or more of, the following features.

Calculating the plurality of oversampled matched filter values includes calculating the plurality of oversampled matched filter values using an estimate of a communication channel between the first communication device and the second communication device.

The method further includes: calculating, at the first communication device, an impulse response of the communication channel between the first communication device and the second communication device by performing an inverse fast Fourier transform (FFT) of a frequency domain estimate of the communication channel between the first communication device and the second communication device; wherein calculating the plurality of oversampled matched filter values includes using the impulse response to calculate the plurality of oversampled matched filter values.

Calculating the plurality of oversampled matched filter values includes: performing a 2-dimensional fast Fourier transform of a frequency domain estimate of the communication channel between the first communication device and the second communication device.

The wireless signal corresponds to a physical layer (PHY) data unit having a PHY preamble; the method further comprises calculating a frequency domain estimate of the communication channel between the first communication device and the second communication device using one or more fields in the PHY preamble of the PHY data unit; and calculating the plurality of oversampled matched filter values includes calculating the plurality of oversampled matched filter values using the frequency domain estimate of the communication channel.

Determining the local maximum of the plurality of oversampled matched filter values comprises: determining a set of local maxima of the plurality of oversampled matched filter values across different values of the signal delay and different values of the phase; and selecting one of the local maxima in the set corresponding to a component of the wireless signal corresponding to a shortest delay.

Determining the set of local maxima comprises determining local maxima among a plurality of oversampled matched filter values that exceed a threshold.

The method further includes: determining, at the first communication device, a maximum delay; wherein determining the set of local maxima comprises determining local maxima that correspond to delays less than the maximum delay.

Determining the maximum delay comprises: determining, at the first communication device, a delay corresponding to a maximum of a sum of squares of impulse response samples across a plurality of antenna elements of the antenna array.

The method further includes: using, at the first communication device, the angle of arrival to determine a location of the second communication device.

In another embodiment, an apparatus comprises: one or more integrated circuits (ICs); and a network interface device associated with a first communication device, wherein the network interface device is implemented on the one or more ICs, the network interface device including a plurality of transceivers. The one or more ICs are configured to: calculate a plurality of oversampled matched filter values corresponding to a wireless signal received at an antenna array of the first communication device, the plurality of matched filter values corresponding to i) different values of a signal delay corresponding to the wireless signal, and ii) different values of a phase corresponding to the wireless signal, wherein the wireless signal was transmitted by a second communication device, wherein the antenna array comprises a plurality of antenna elements, and wherein the plurality of transceivers is coupled to the antenna array; determine a local maximum of the plurality of oversampled matched filter values across different values of the signal delay and different values of the phase, the local maximum of the plurality of matched filter values corresponding to a component of the wireless signal that is first to arrive at the antenna array; and calculate an angle of arrival using a value of the phase corresponding to the local maximum of the plurality of matched filter values, wherein the angle of arrival corresponds to an angle of incidence at the antenna array of the wireless signal.

In other embodiments, the apparatus includes one of, or any suitable combination of two or more of, the following features.

The one or more ICs are configured to calculate the plurality of oversampled matched filter values using an estimate of a communication channel between the first communication device and the second communication device.

The one or more ICs are configured to: calculate an impulse response of the communication channel between the first communication device and the second communication device by performing an inverse fast Fourier transform (FFT) of a frequency domain estimate of the communication channel between the first communication device and the second communication device; and use the impulse response to calculate the plurality of oversampled matched filter values.

The one or more ICs are configured to: perform a 2-dimensional fast Fourier transform of a frequency domain estimate of the communication channel between the first communication device and the second communication device as part of calculating the plurality of oversampled matched filter.

The wireless signal corresponds to a physical layer (PHY) data unit having a PHY preamble; the network interface device includes a channel estimator configured to calculate a frequency domain estimate of the communication channel between the first communication device and the second communication device using one or more fields in the PHY preamble of the PHY data unit; and the one or more ICs are configured to use the frequency domain estimate of the communication channel to calculate the plurality of oversampled matched filter values.

The one or more ICs are configured to: determine a set of local maxima of the plurality of oversampled matched filter values across different values of the signal delay and different values of the phase; and select one of the local maxima in the set corresponding to a component of the wireless signal corresponding to a shortest delay.

Determining the set of local maxima comprises determining local maxima among a plurality of oversampled matched filter values that exceed a threshold.

The one or more ICs are configured to: determine a maximum delay; and determine the set to include only local maxima that correspond to delays less than the maximum delay.

The one or more ICs are configured to: determine the maximum delay as a delay corresponding to a maximum of a sum of squares of impulse response samples across a plurality of antenna elements of the antenna array.

The one or more ICs are configured to: use the angle of arrival to determine a location of the second communication device.

The apparatus further comprises: one or more processors implemented on the one or more ICs; and one or more memory devices coupled to, or implemented on, the one or more ICs; and the one or more memory devices store machine readable instructions that, when executed by the one or more processors, cause the one or more processors to: determine the local maximum of the plurality of oversampled matched filter values, and calculate the angle of arrival.

At least one processor is a component of the network interface device; and the machine readable instructions, when executed by the at least one processor, cause the at least one processors to, at least one of: i) determine the local maximum of the plurality of oversampled matched filter values, and ii) calculate the angle of arrival.

At least one processor is separate from and coupled to the network interface device; and the machine readable instructions, when executed by the at least one processor, cause the at least one processors to, at least one of: i) determine the local maximum of the plurality of oversampled matched filter values, and ii) calculate the angle of arrival.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method comprising:
    receiving, at an antenna array of a first communication device, a wireless signal transmitted by a second communication device, wherein the antenna array comprises a plurality of antennas;
    calculating, at the first communication device, a plurality of oversampled matched filter values corresponding to the wireless signal, the plurality of oversampled matched filter values corresponding to i) different values of a signal time delay corresponding to different components of the wireless signal, and ii) different values of a phase corresponding to the different components of the wireless signal;
    performing, at the first communication device, a two-dimensional search of the plurality of oversampled matched filter values across different values of the signal time delay and different values of the phase to determine a plurality of local maxima corresponding to respective pairs of signal time delays and phases;
    determining, at the first communication device, a first local maximum from among the plurality of local maxima, the first local maximum of the plurality of matched filter values corresponding to a component, that is first to arrive at the antenna array, of the wireless signal; and
    calculating, at the communication device, an angle of arrival using a value of the phase corresponding to the first local maximum of the plurality of matched filter values, wherein the angle of arrival corresponds to an angle of incidence at the antenna array of the wireless signal.

2. The method of claim 1, wherein calculating the plurality of oversampled matched filter values includes calculating the plurality of oversampled matched filter values using an estimate of a communication channel between the first communication device and the second communication device.

3. The method of claim 2, further comprising:
    calculating, at the first communication device, an impulse response of the communication channel between the first communication device and the second communication device by performing an inverse fast Fourier transform (FFT) of a frequency domain estimate of the communication channel between the first communication device and the second communication device;
    wherein calculating the plurality of oversampled matched filter values includes using the impulse response to calculate the plurality of oversampled matched filter values.

4. The method of claim 2, wherein calculating the plurality of oversampled matched filter values includes:
    performing a 2-dimensional fast Fourier transform of a frequency domain estimate of the communication channel between the first communication device and the second communication device.

5. The method of claim 2, wherein:
    the wireless signal corresponds to a physical layer (PHY) data unit having a PHY preamble;
    the method further comprises calculating a frequency domain estimate of the communication channel between the first communication device and the second communication device using one or more fields in the PHY preamble of the PHY data unit; and
    calculating the plurality of oversampled matched filter values includes calculating the plurality of oversampled matched filter values using the frequency domain estimate of the communication channel.

6. The method of claim 1, wherein determining the first local maximum from among the plurality of local maxima comprises:
    selecting one of the local maxima in the plurality of local maxima corresponding to a component of the wireless signal corresponding to a shortest time delay.

7. The method of claim 6, wherein determining the plurality of local maxima comprises determining local maxima among a plurality of oversampled matched filter values that exceed a threshold.

8. The method of claim 6, further comprising:
    determining, at the first communication device, a maximum time delay;
    wherein determining the plurality of local maxima comprises determining local maxima that correspond to time delays less than the maximum time delay.

9. The method of claim 8, wherein determining the maximum time delay comprises:
    determining, at the first communication device, a time delay corresponding to a maximum of a sum of squares of impulse response samples across a plurality of antenna elements of the antenna array.

10. The method of claim 1, further comprising:
    using, at the first communication device, the angle of arrival to determine a location of the second communication device.

11. An apparatus, comprising:
    one or more integrated circuits (ICs); and
    a network interface device associated with a first communication device, wherein the network interface device is implemented on the one or more ICs, the network interface device including a plurality of transceivers;
    wherein the one or more ICs are configured to:
        calculate a plurality of oversampled matched filter values corresponding to a wireless signal received at an antenna array of the first communication device, the plurality of oversampled matched filter values corresponding to i) different values of a signal time delay corresponding to different components of the wireless signal, and ii) different values of a phase corresponding to the different components of the wireless signal, wherein the wireless signal was transmitted by a second communication device, wherein the antenna array comprises a plurality of antenna elements, and wherein the plurality of transceivers is coupled to the antenna array,
        perform a two-dimensional search of the plurality of oversampled matched filter values across different values of the signal time delay and different values of the phase to determine a plurality of local maxima corresponding to respective pairs of signal time delays and phases,
        determine a first local maximum from among the plurality of local maxima, the first local maximum of the plurality of matched filter values corresponding to a component, that is first to arrive at the antenna array, of the wireless signal, and
        calculate an angle of arrival using a value of the phase corresponding to the first local maximum of the plurality of matched filter values, wherein the angle of arrival corresponds to an angle of incidence at the antenna array of the wireless signal.

12. The apparatus of claim 11, wherein the one or more ICs are configured to calculate the plurality of oversampled matched filter values using an estimate of a communication channel between the first communication device and the second communication device.

13. The apparatus of claim 12, wherein the one or more ICs are configured to:
calculate an impulse response of the communication channel between the first communication device and the second communication device by performing an inverse fast Fourier transform (FFT) of a frequency domain estimate of the communication channel between the first communication device and the second communication device; and
use the impulse response to calculate the plurality of oversampled matched filter values.

14. The apparatus of claim 12, wherein the one or more ICs are configured to:
perform a 2-dimensional fast Fourier transform of a frequency domain estimate of the communication channel between the first communication device and the second communication device as part of calculating the plurality of oversampled matched filter.

15. The apparatus of claim 12, wherein:
the wireless signal corresponds to a physical layer (PHY) data unit having a PHY preamble;
the network interface device includes a channel estimator configured to calculate a frequency domain estimate of the communication channel between the first communication device and the second communication device using one or more fields in the PHY preamble of the PHY data unit; and
the one or more ICs are configured to use the frequency domain estimate of the communication channel to calculate the plurality of oversampled matched filter values.

16. The apparatus of claim 11, wherein the one or more ICs are configured to:
select one of the local maxima in the plurality of local maxima corresponding to a component of the wireless signal corresponding to a shortest time delay.

17. The apparatus of claim 16, wherein determining the plurality of local maxima comprises determining local maxima among a plurality of oversampled matched filter values that exceed a threshold.

18. The apparatus of claim 16, wherein the one or more ICs are configured to:
determine a maximum time delay; and
determine the plurality of local maxima to include only local maxima that correspond to time delays less than the maximum time delay.

19. The apparatus of claim 18, wherein the one or more ICs are configured to:
determine the maximum time delay as a time delay corresponding to a maximum of a sum of squares of impulse response samples across a plurality of antenna elements of the antenna array.

20. The apparatus of claim 11, wherein the one or more ICs are configured to:
use the angle of arrival to determine a location of the second communication device.

21. The apparatus of claim 11, further comprising:
one or more processors implemented on the one or more ICs; and
one or more memory devices coupled to, or implemented on, the one or more ICs, wherein the one or more memory devices store machine readable instructions that, when executed by the one or more processors, cause the one or more processors to:
determine the first local maximum from among the plurality of local maxima, and
calculate the angle of arrival.

22. The apparatus of claim 21, wherein:
at least one processor is a component of the network interface device; and
the machine readable instructions, when executed by the at least one processor, cause the at least one processors to, at least one of:
i) determine the first local maximum from among the plurality of local maxima, and
ii) calculate the angle of arrival.

23. The apparatus of claim 21, wherein:
at least one processor is separate from and coupled to the network interface device; and
the machine readable instructions, when executed by the at least one processor, cause the at least one processors to, at least one of:
i) determine the first local maximum from among the plurality of local maxima, and
ii) calculate the angle of arrival.

* * * * *